United States Patent [19]
Gill

[11] Patent Number: 5,903,415
[45] Date of Patent: May 11, 1999

[54] AP PINNED SPIN VALVE SENSOR WITH PINNING LAYER RESET AND ESD PROTECTION

[75] Inventor: Hardayal Singh Gill, Portola Valley, Calif.

[73] Assignee: International Business Machines Corporation, Armonk, N.Y.

[21] Appl. No.: 08/988,619

[22] Filed: Dec. 11, 1997

[51] Int. Cl.⁶ .................................. G11B 5/39; G11B 5/40
[52] U.S. Cl. .............................................. 360/113; 360/75
[58] Field of Search ...................... 360/113, 75; 324/252, 324/207.21; 365/8, 157, 158; 338/32 R, 32 H

[56] References Cited

U.S. PATENT DOCUMENTS

| | | | |
|---|---|---|---|
| 5,465,185 | 11/1995 | Heim et al. | 360/113 |
| 5,650,887 | 7/1997 | Dovek et al. | 360/75 |
| 5,657,190 | 8/1997 | Araki et al. | 360/113 |
| 5,748,412 | 5/1998 | Murdock et al. | 360/113 |
| 5,757,591 | 5/1998 | Carr et al. | 360/113 |
| 5,828,529 | 10/1998 | Gill | 360/113 |

FOREIGN PATENT DOCUMENTS

| | | |
|---|---|---|
| 651375 | 5/1995 | European Pat. Off. . |
| 6-60338 | 3/1994 | Japan . |
| 6-103508 | 4/1994 | Japan . |
| 8-45033 | 2/1996 | Japan . |

*Primary Examiner*—David L. Ometz
*Attorney, Agent, or Firm*—Gray Cary Ware Freidenrich

[57] ABSTRACT

An antiparallel pinned spin valve sensor is provided in combination with electrostatic discharge (ESD) protection circuits, for preventing ESD destabilization of the magnetic spins of an antiferromagnetic pinning layer, and a reset pulse generator, for generating a pulse for resetting the magnetic spins of the antiferromagnetic pinning layer, wherein the ESD circuits and the reset pulse generator are compatible with one another. A first ESD protection circuit has a turn-on voltage in the direction of the sense current and a second ESD protection has a turn-on voltage in a direction opposite to the sense current. The turn-on voltage of the first ESD protection circuit is sufficiently high to minimize shunting of the sense current past the AP spin valve sensor. The reset voltage is higher than the sense voltage and may be just less than the turn-on voltage of the first ESD protection circuit. The turn-on voltage of the first ESD protection circuit may be slightly less than the melting temperatures of the layers of the AP spin valve sensor. The turn-on voltage of the second ESD protection circuit is less than the turn-on voltage of the first ESD protection circuit, such as 50% thereof. The turn-on voltage of the second ESD protection circuit should be less since no reset function is implemented in that direction and ESDs in that direction will destabilize the antiferromagnetic layer.

51 Claims, 6 Drawing Sheets

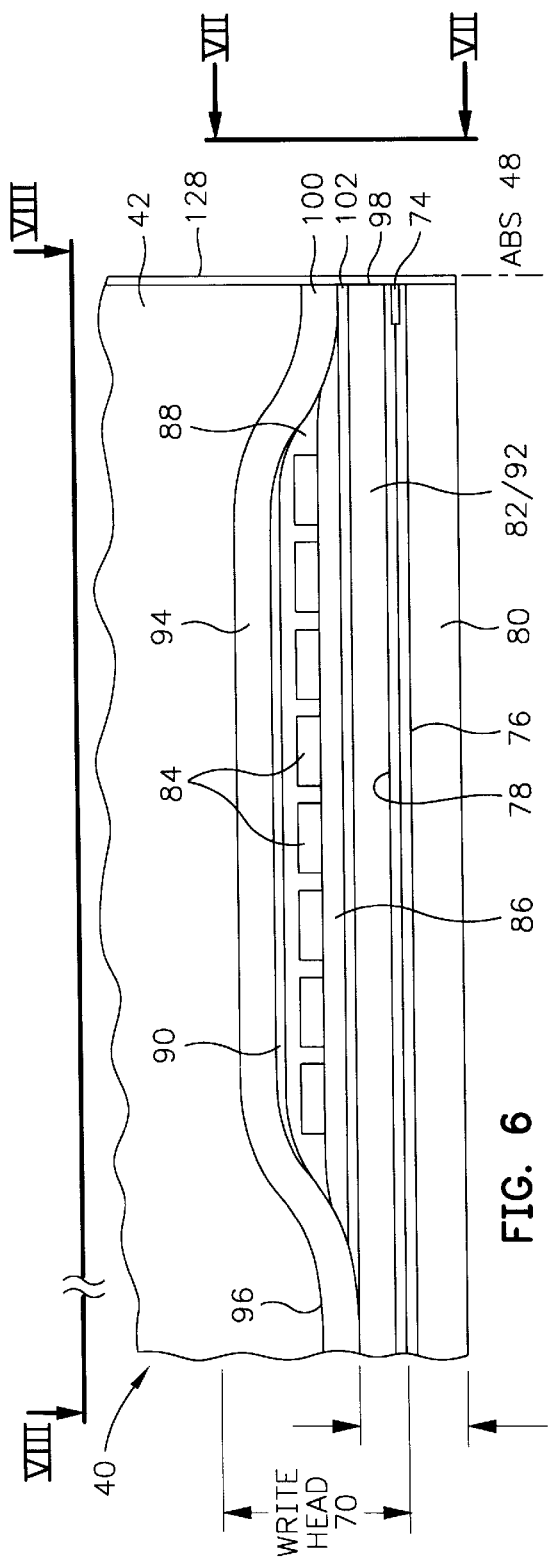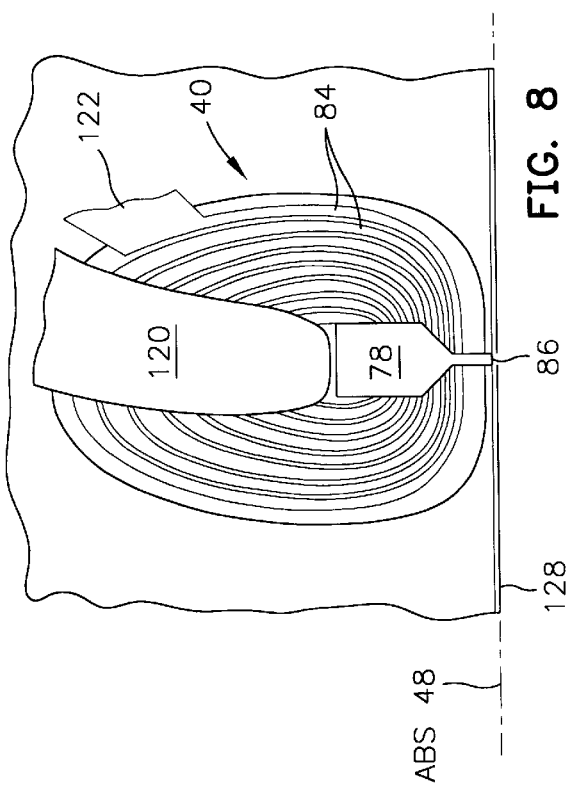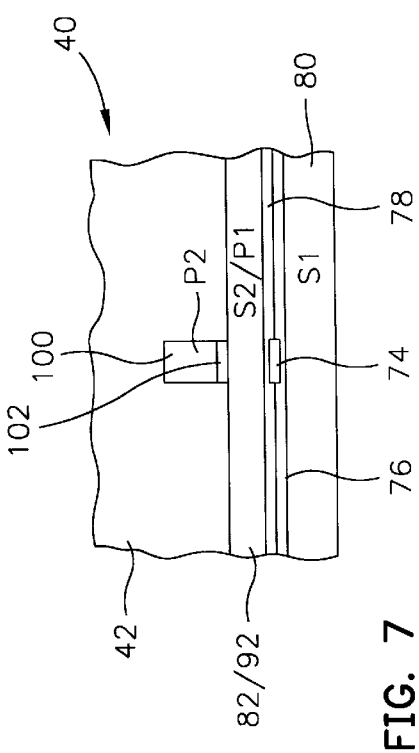

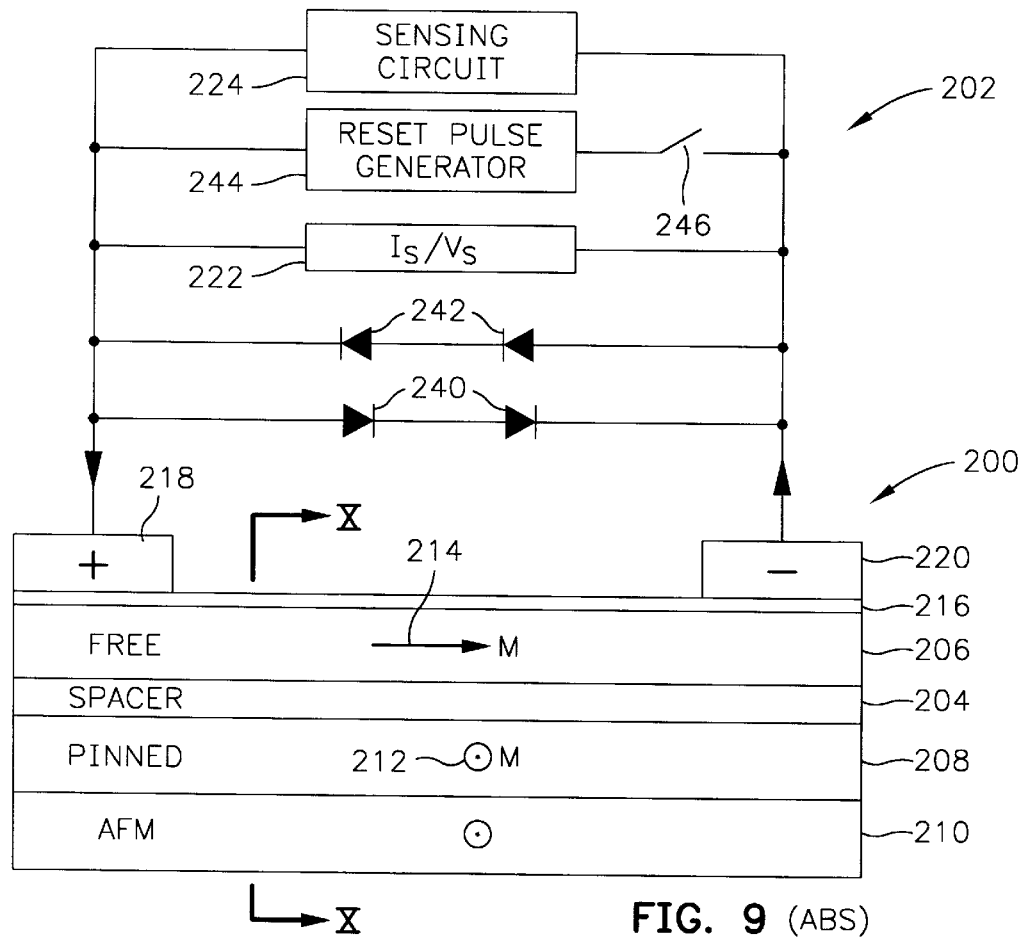
FIG. 9 (ABS)
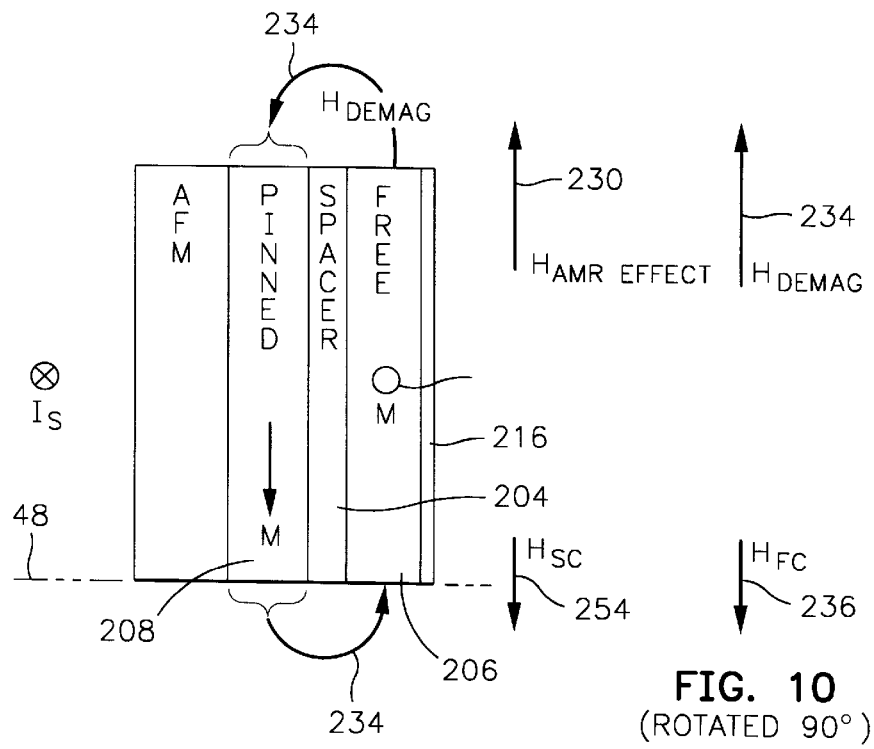
FIG. 10 (ROTATED 90°)

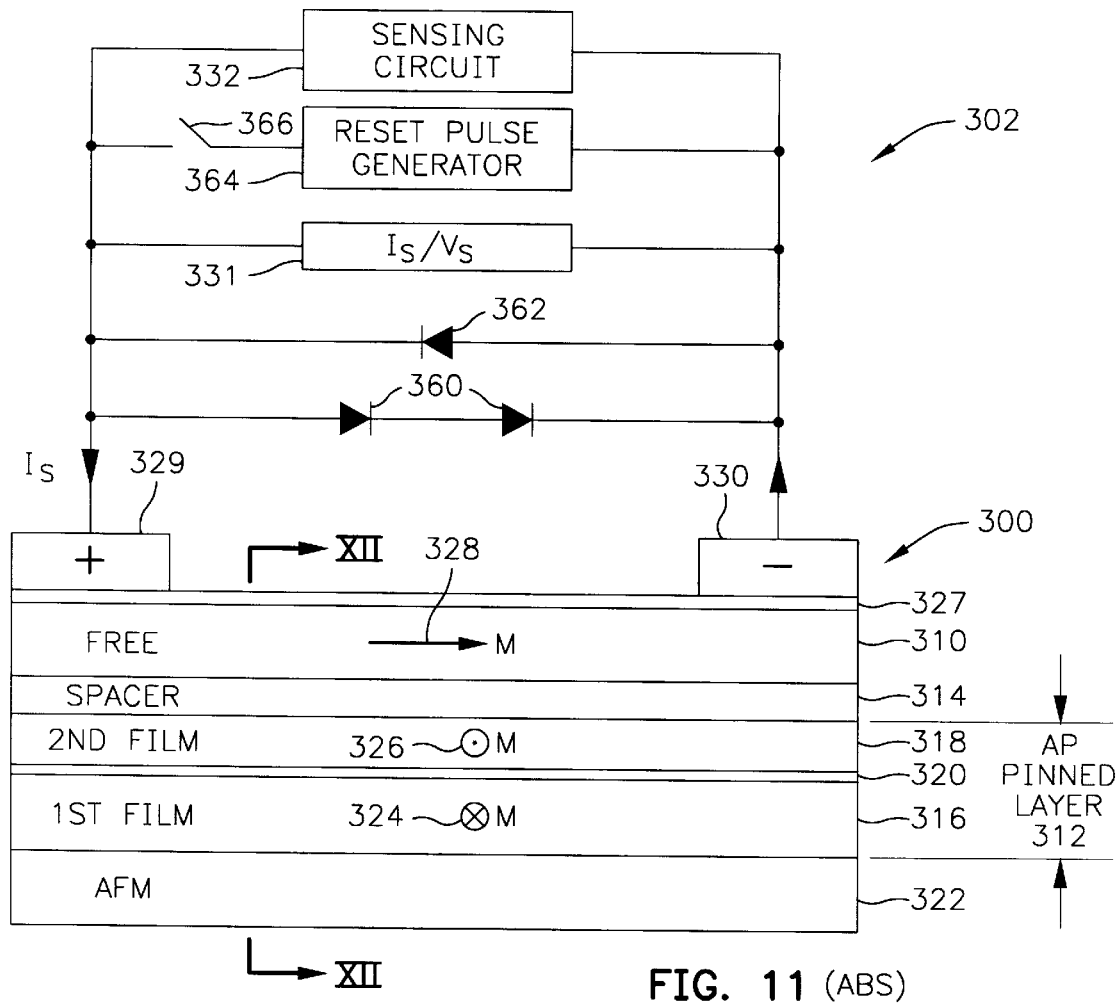
FIG. 11 (ABS)
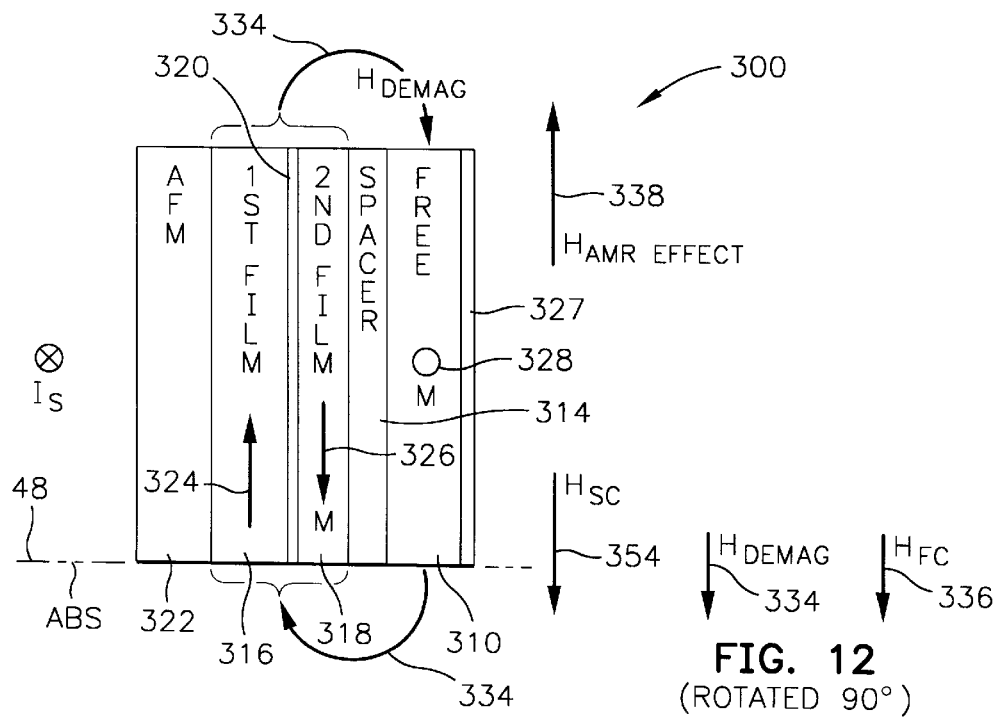
FIG. 12
(ROTATED 90°)

($H_{SC}$)

($H_{AMR\ EFFECT}$)

($H_{AMR\ EFFECT} - H_{SC}$)

AP PINNED SPIN VALVE SENSOR WITH PINNING LAYER RESET AND ESD PROTECTION

BACKGROUND OF THE INVENTION

1. Field of the Invention

The present invention relates to an antiparallel (AP) pinned spin valve sensor with a pinning layer reset circuit and electrostatic discharge (ESD) protection circuit and, more particularly, to an ESD protection circuit for an AP pinned spin valve sensor that is compatible with a reset circuit so that objectives of both circuits can be fully realized.

2. Description of the Related Art

A spin valve sensor is employed by a read head for sensing magnetic fields from moving magnetic media, such as a magnetic disk or a magnetic tape. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned 90° to the magnetization of the free layer and the magnetization of the free layer is free to respond to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with the pinned and free layers. When the magnetizations of the pinned and free layers are parallel with respect to one another, scattering is minimal; when the magnetizations of the pinned and free layers are antiparallel, scattering is maximized. Changes in scattering alter the resistance of the spin valve sensor in proportion to sin θ, where θ is the angle between the magnetizations of the pinned and free layers. A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor.

A read head employing a spin valve sensor (hereinafter referred to as a "spin valve read head") may be combined with an inductive write head to form a combined magnetic head. In a magnetic disk drive, an air bearing surface (ABS) of a combined magnetic head is supported adjacent a rotating disk to write information on or read information from the disk. Information is written to the rotating disk by magnetic fields which fringe across a gap between the first and second pole pieces of the write head. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

An improved spin valve sensor, which is referred to hereinafter as an antiparallel (AP) pinned spin valve sensor, is described in commonly assigned U.S. Pat. No. 5,465,185 to Heim and Parkin which is incorporated by reference herein. The AP pinned spin valve sensor differs from a single film pinned layer spin valve sensor, described above, in that the pinned layer of the AP pinned spin valve sensor comprises multiple thin films, which are collectively referred to as an antiparallel (AP) pinned layer. The AP pinned layer has a nonmagnetic spacer film sandwiched between first and second ferromagnetic thin films. The first thin film is exchange coupled to the antiferromagnetic layer by being immediately adjacent thereto and has its magnetic moment directed in a first direction. The second thin film is immediately adjacent to the free layer and is exchange coupled to the first thin film by the minimal thickness (in the order of 5 Å) of the spacer film between the first and second thin films. The magnetic moment of the second thin film is oriented in a second direction that is antiparallel to the direction of the magnetic moment of the first film. The magnetic moments of the first and second films subtractively combine to provide a net pinning moment of the pinned layer. The direction of the net moment is determined by the thicker of the first and second thin films. The thicknesses of the first and second thin films are chosen to reduce the net moment. A reduced net moment equates to a reduced demagnetization (demag) field from the AP pinned layer. Since the antiferromagnetic exchange coupling is inversely proportional to the net pinning moment, this increases exchange coupling.

A high exchange coupling promotes higher thermal stability of the head. When the head encounters elevated thermal conditions caused by electrostatic discharge (ESD) from an object or person, or by contacting an asperity on a magnetic disk, the blocking temperature of the antiferromagnetic layer can be exceeded, resulting in disorientation of its magnetic spins. The magnetic moment of the pinned layer is then no longer pinned in the desired direction.

Significant advantages of the AP pinned spin valve over the typical single film pinned layer include a greater exchange coupling field and a lower demag field, which enhance thermal stability in the AP pinned spin valve sensor.

ESD is particularly troublesome for both the single pinned layer spin valve sensor and the AP pinned spin valve sensor. Multiple magnetic heads employing the sensors are made in rows and columns on a wafer. After construction of the heads on the wafer, the wafer is diced into rows. At the wafer and/or the row level the antiferromagnetic pinning layer of either spin valve sensor is subjected to heat above its blocking temperature in the presence of a magnetic field to orient the magnetic spins of the antiferromagnetic pinning layer in a direction that is perpendicular to the ABS. After dicing the row into individual magnetic heads, each head is manually mounted by an assembler on a suspension of a magnetic disk drive. When the magnetic head is mounted on the suspension it is typically connected to an ESD protection circuit. Unfortunately, before the head is mounted on the suspension it is at risk of ESD from the assembler or contact with another object that may destabilize the magnetic spins of the antiferromagnetic pinning layer. A multiple head disk drive can be rendered unmarketable if only one head is destabilized. Accordingly, there needs to be a reset circuit at the suspension level or on the magnetic disk drive for resetting the magnetic spins of the antiferromagnetic pinning layer. The problem is providing reset and ESD circuits that are compatible with one another.

It is necessary that the ESD circuit provide adequate ESD protection while allowing the reset circuit to apply a voltage with a sufficiently high pulse to reset the antiferromagnetic pinning layer. It is also necessary that the ESD circuit provide sufficient turn-on voltage in the direction of the sense current to prevent shunting of the sense current. Diodes (which are used for ESD protection) inherently have a small amount of leakage current which may be decreased by placing multiple diodes in the direction of the sense current. Shunting of the sense current through ESD protection diodes significantly impacts the readback signal. Accordingly, sufficient turn-on voltage must be employed in the direction of the sense current to substantially eliminate sense current leakage. Another factor bearing on compatibility is that in both the single film pinned layer spin valve sensor and the AP pinned spin valve sensor the sense current must be in a predetermined direction to balance a sense current field with other fields and influences on the spin valve sensor which is discussed next.

Both the single film pinned layer spin valve sensor and the AP pinned spin valve sensor demonstrate an AMR influence on the free layer that is also characteristic of an AMR sensor. This is because of the relative rotation between the directions of the magnetic moment of the free layer of the spin valve sensor and the sense current. AMR is employed in the AMR sensor for detecting signals and is due to a change in resistance of an MR stripe as the magnetic moment of the MR stripe rotates relative to the sense current in response to magnetic fields from a rotating disk. The AMR may substantially change the position of the bias point of the spin valve sensor relative to positive and negative readback signals detected by the sensor. The influence of the AMR effect on the free layer must therefore be dealt with in establishing the bias point.

The transfer curve (a plot of the readback signal of the spin valve head versus the applied signal from the magnetic disk) for a spin valve sensor is defined by sin θ, where θ is the angle between the directions of the magnetic moments of the free and pinned layers. A substantially flat portion of the transfer curve is selected for location of the bias point so that response of the sensor is substantially linear. Since positive and negative magnetic fields from a moving magnetic disk are typically equal in magnitude, it is important that positive and negative changes in the GMR of the spin valve sensor about the bias point on the transfer curve also be equal.

The location of the bias point on the transfer curve is influenced by four major forces on the free layer: a ferromagnetic coupling field $H_{FC}$ between the pinned layer and the free layer; a demag field $H_{demag}$ on the free layer from the pinned layer; a sense current field $H_{SC}$ from all conductive layers of the spin valve (except the free layer; and, the influence of the AMR. The influence of the AMR on the bias point is the same as a magnetic influence thereon and it can be defined in terms of magnitude and direction. This influence is referred to herein as the AMR EFFECT.

In the single pinned layer spin valve, $H_{demag}$ and the AMR effect are balanced by $H_{FC}$ and $H_{SC}$. In the AP pinned spin valve sensor the AMR effect is balanced by $H_{demag}$, $H_{FC}$ and $H_{SC}$ for the purpose of promoting symmetry of the read signal.

SUMMARY OF THE INVENTION

I found that a reset circuit for resetting the antiferromagnetic pinning layer of the single film pinned layer spin valve described hereinabove was not compatible with ESD circuitry for protecting the sensor from ESD. The problem was that ESD magnitude slightly less than the turn-on voltage of the ESD circuit would destabilize the antiferromagnetic pinning layer. In contrast to the single film pinned layer spin valve sensor, I found a reset circuit and ESD protection circuit that are compatible with the AP pinned spin valve sensor described hereinabove. The ESD circuit employs sufficient turn-on voltage in the direction of the sense current to prevent leakage which is compatible with a reset pulse above the sense voltage for resetting the antiferromagnetic pinning layer. ESD in the direction of the sense current above the sense voltage but below the turn-on voltage poses no problem since it is in the direction for resetting the antiferromagnetic pinning layer. In the direction of the sense current, the turn-on voltage of the ESD circuit can be just below the turn-on voltage that would cause an ESD to melt the components of the AP spill valve. An ESD in the direction opposite to the sense current is a problem to an AP pinned spin valve sensor without ESD protection. An ESD in the direction opposite to the sense current results in disorienting the magnetic spins of the antiferromagnetic pinning layer. This problem can be overcome by employing an ESD circuit in the direction opposite to the sense current that turns on at a voltage level lower than a voltage that destabilizes the antiferromagnetic pinning layer. Accordingly, I have provided a reset circuit and ESD circuit in combination with a properly balanced AP pinned spin valve that permits resetting the antiferromagnetic pinning layer, prevents shunting of the sense current, and prevents ESDs from destabilizing the antiferromagnetic pinning layer.

An object of the present invention is to provide a reset circuit and an ESD circuit for an AP pinned spin valve whose operations are compatible.

Another object is to increase manufacturing yield of AP pinned spin valve sensors mounted on a magnetic disk drive.

A further object is to provide a properly balanced AP pinned spin valve that permits resetting the antiferromagnetic pinning layer, prevents shunting of the sense current and prevents ESDs from destabilizing the antiferromagnetic pinning layer.

Other objects and advantages of the invention will become apparent upon reading the following description taken together with the accompanying drawings.

BRIEF DESCRIPTION OF THE DRAWINGS

FIG. 6 is a partial view of the slider and magnetic head as seen in plane VI—VI of FIG. 2;

FIG. 7 is a partial ABS view of the slider taken along plane VII—VII of FIG. 6 to show the read and write elements of the magnetic head;

FIG. 8 is a view taken along plane VIII—VIII of FIG. 6 with all material above the second pole piece removed;

FIG. 9 is an ABS view of a single film pinned layer spin valve sensor with circuitry connected thereto shown in block form;

FIG. 10 is view along plane X—X of FIG. 9 rotated 90°;

FIG. 11 is an ABS view of an AP pinned spin valve sensor with circuitry connected thereto shown in block form;

FIG. 12 is a view taken along plane XII—XII of FIG. 11 rotated 90°;

DESCRIPTION OF THE PREFERRED EMBODIMENTS

Magnetic Disk Drive

Figure 1:
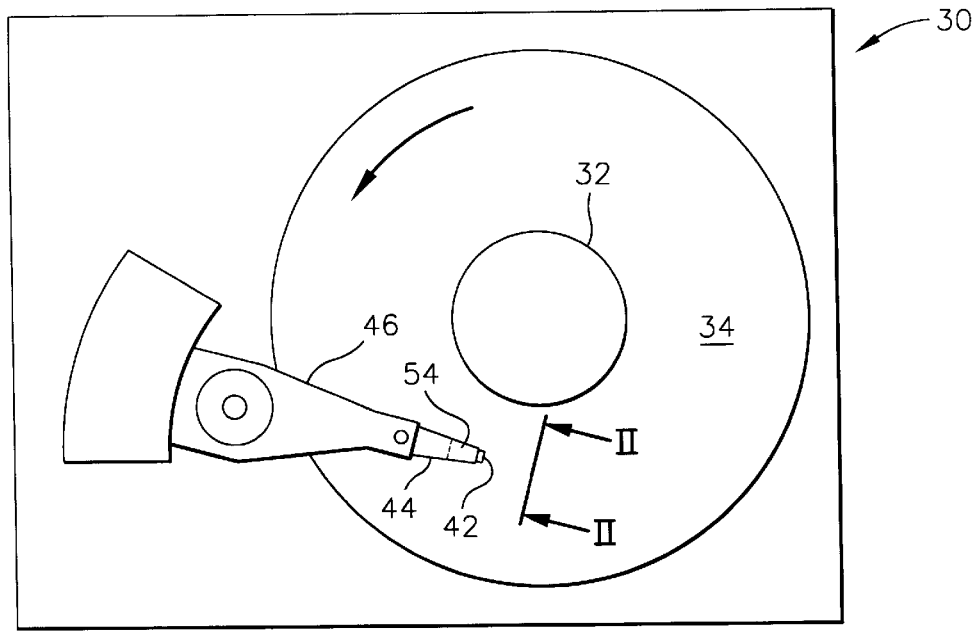
FIG. 1 is a planar view of an exemplary magnetic disk drive.
Figure 2:
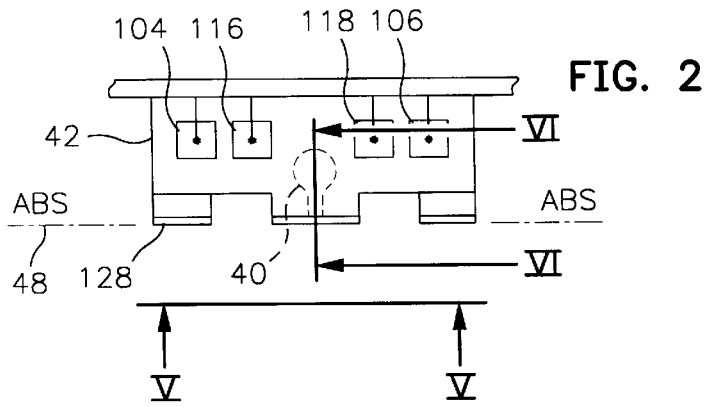
FIG. 2 is an end view of a slider with a magnetic head of the disk drive as seen in plane II—II.
Figure 3:
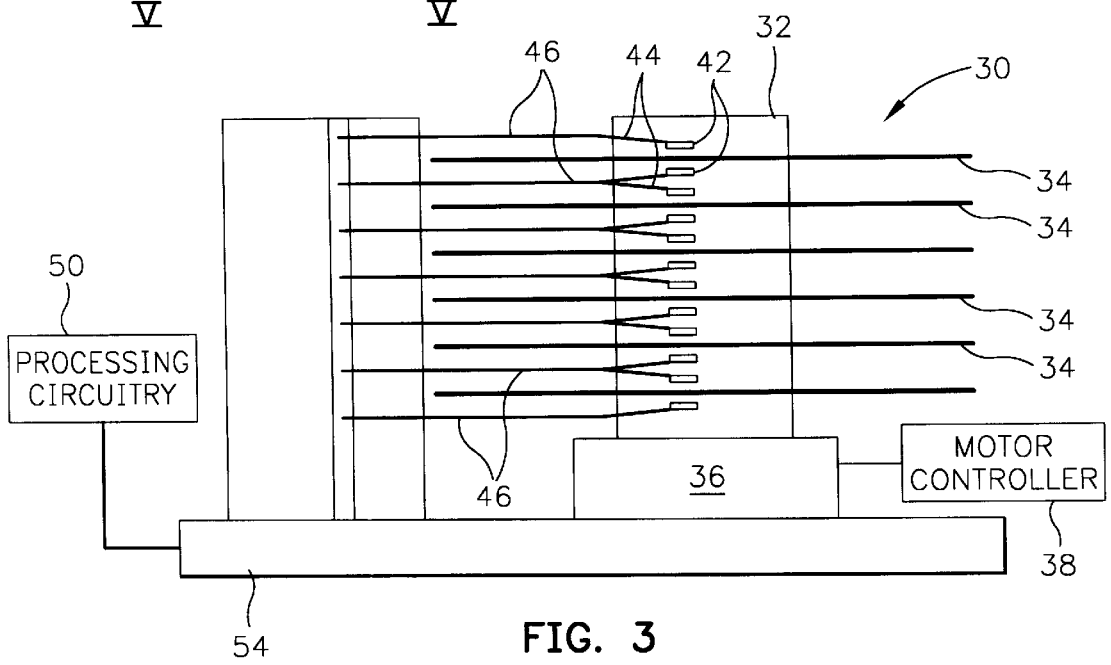
FIG. 3 is an elevation view of the magnetic disk drive wherein multiple disks and magnetic heads are employed.
Figure 4:
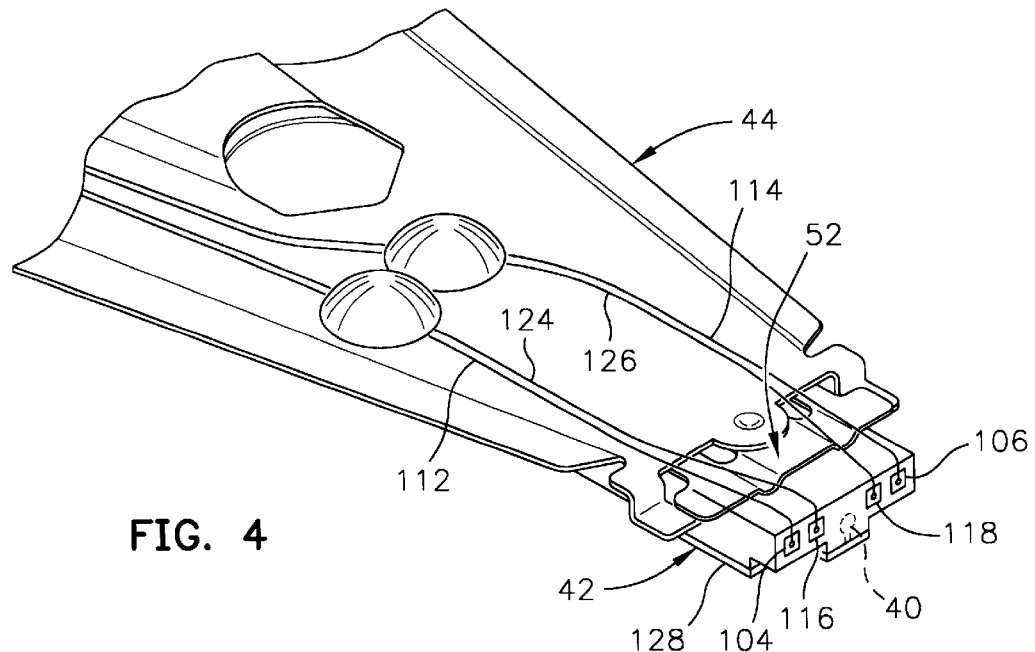
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
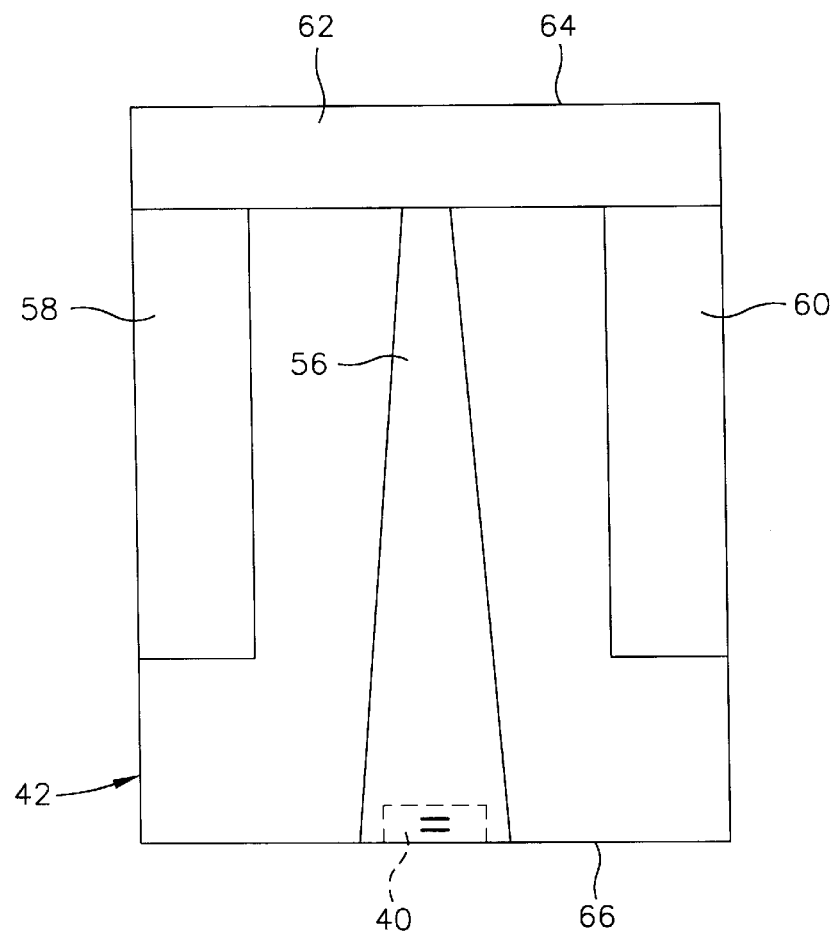
FIG. 5 is an ABS view of the magnetic head taken along in plane V—V of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of the merged MR head 40, which includes a write head portion 70 and a read head portion 72, the read head portion employing an AP pinned spin valve sensor 74 of the present invention. FIG. 7 is an ABS view of FIG. 6. The spin valve sensor 74 is sandwiched between first and second gap layers 76 and 78, and the gap layers are sandwiched between first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7.

First Investigation

FIG. 9 is an ABS view of a single film pinned layer spin valve sensor 200 which is connected to processing circuitry 202. The spill valve sensor 200 includes a non-magnetic electrically conductive spacer layer 204 sandwiched between a ferromagnetic free layer 206 and a ferromagnetic pinned layer 208. An antiferromagnetic layer 210 interfacially engages the pinned layer 208. The antiferromagnetic layer has its magnetic spins oriented out of the drawing which, by exchange coupling, cause the magnetic moment 212 of the pinned layer to be directed out of the drawing and toward the ABS. The free layer 206 has a magnetic moment 214 directed generally parallel to the ABS. The free layer 206 is typically capped with an electrically conductive capping layer 216, such as tantalum. Electrically conductive leads 218 and 220 are connected to opposite ends of the sensor 200; the distance between the connections of the leads to the sensor defines the track width of the sensor. A sense current circuit 222 and a sensing circuit 224 art connected in parallel to the spin valve sensor 200. The sense current circuit 222 applies a sense current through the sensor from left to right as shown in FIG. 9, and a sense voltage thereacross, which are substantially constant. When the sensor 200 is subjected to magnetic fields from a rotating magnetic disk, the fields rotate the moment 214 of the free layer causing its angular position with respect to the fixed moment 212 of the pinned layer to change upwardly and downwardly, depending upon the polarity of the field signals from a rotating magnetic disk. This causes corresponding resistance changes in the sensor which, in turn, causes potential changes across the sensor which are detected by the sensing circuit 224 as readback signals.

The direction of the magnetic moment 214 of the free layer is influenced by various factors. As shown in FIG. 10, these factors are the AMR EFFECT 230, which is caused by relative rotation of the magnetic moment 214 with respect to the direction of the sense current, $H_{demag}$ 234, which is caused by the stray fields from the pinned layer 208, $H_{FC}$ 236, which is caused by a ferromagnetic coupling between the pinned layer 208 and the free layer 206, and $H_{SC}$ 254, which is caused by a sense current field imposed on the free layer 206 when the sense current is conducted through the electrically conductive layers of the sensor 200 other than the free layer 206. The AMR EFFECT will be discussed in more detail hereinafter under my second investigation. It should be noted for now that the AMR EFFECT and $H_{demag}$ are directed opposite to $H_{SC}$ and $H_{FC}$. This has been found to be an optimal arrangement for appropriately positioning the direction of the magnetic moment 214 of the free layer 206 to establish a desired bias point on the transfer curve and read signal symmetry.

It is important that the sensor 200 be protected from electrostatic discharges (ESDs) which are caused by contact with objects or persons carrying static electricity or by contact with a rotating magnetic disk. ESD protection circuits 240 and 242 are connected in parallel across the sensor generally at the suspension level. Accordingly, from the time that the antiferromagnetic layer 210 has its magnetic spins set by heat and temperature at the wafer or row level, until the time that the magnetic head is installed on the suspension, the magnetic head is subject to risk of destabilization of the magnetic spins of the antiferromagnetic layer by objects or persons handling the magnetic head before it is installed on the suspension.

The ESD protection circuit 240 is provided with a sufficiently high turn-on voltage so as to prevent shunting of the sense current $I_S$ therethrough. This is represented by two diodes which, in combination, permit substantially full conduction of the sense current through the sensor but turn on to shunt any ESD which has a voltage that exceeds the turn-on voltage of the circuit 240. The circuit 240 conducts in the same direction as the sense current $I_S$. The ESD protection circuit 242 conducts in an opposite direction to the sense current $I_S$ and is shown with an exemplary turn-on voltage which may be substantially the same as the turn-on voltage of the circuit 240. Accordingly, ESD in a reverse direction to the sense current $I_S$ will be shunted through the circuit 242 when the voltage of the ESD exceeds the turn-on voltage of the circuit 242.

Before a magnetic head employing the sensor 200 is mounted on the suspension and connected to the ESD protection circuits 240 and 242, the sensor 200 may have been subjected to an ESD that destabilized the magnetic spins of the antiferromagnetic layer 210. This may not be known until the magnetic head has been installed on the suspension and the suspension installed in the magnetic disk drive. This equates to a significant amount of costly labor. Without some scheme for resetting the sensor of one or more magnetic heads dedicated to a magnetic disk drive, the drive may be unmarketable. In order to correct this problem, I investigated connecting a reset pulse generator circuit 244 in parallel across the sensor 200 at the time of mounting the magnetic head on the suspension. The reset pulse generator 244 would then provide a current in a direction opposite to the sense current $I_S$ through the sensor at a reset voltage which is less than the turn-on voltage of the ESD circuit 242 for a predetermined duration of time. It should be noted that ESD in a direction opposite to the sense current $I_S$ will not harm the sensor and will generally reset the antiferromagnetic layer 210 up to a point where the ESD is high enough to damage the sensor by melting its layers. If the sensor has been subject to an ESD in the positive direction, namely in the direction of the sense current $I_S$, that destabilizes the magnetic spins of the antiferromagnetic layer 210, the reset pulse generator 244 is activated by a switch 246 for conducting the reset pulse through the sensor to re-orient the magnetic spins of the antiferromagnetic layer 210.

My investigation of the single film pinned layer spin valve sensor 200 showed that there is one problem which, at this time, has no simple solution with ESD circuits. The problem is that when an ESD is in the same direction as the sense current and just below the turn-on voltage of the ESD protection circuit 240, it will be conducted through the conductive layers 204, 206 and 216 causing a field on the antiferromagnetic layer 210 which will destabilize the magnetic spins of the antiferromagnetic layer. This problem could be avoided by removing, one of the diodes of the ESD protection circuit 240, however, this would the increase the leakage of the sense current through the circuit 240, which leakage reduces the signal response of the sensor. Accordingly, it is desirable to maintain a higher turn-on voltage for the ESD circuit 240, as represented by two diodes, to prevent shunting of the sense current while providing complete ESD protection and reset function capability. It should also be noted that in the sensor 200 the sense current $I_S$ flows in a direction through the electrically conductive layers 204, 206 and 216 which imposes a field in a direction opposite to the direction of the magnetic moment of the pinned layer 208. This reduces the strength of the magnetic moment of the pinned layer 208 which is overcome in my second investigation.

Second Investigation

The sensor 300 shown in FIGS. 11 and 12 is connected in parallel with processing circuitry 302. The sensor 300 has a ferromagnetic free layer 310, an antiparallel pinned ferromagnetic layer 312, and a nonmagnetic electrically conductive spacer layer 314. The spacer layer 314 is sandwiched between the free layer 310 and the pinned layer 312. The AP pinned layer 312 differs from the typical spin valve sensor, which employs a single film pinned layer, in that the AP pinned layer 312 employs first and second ferromagnetic films 316 and 318 which are separated by a nonmagnetic electrically conductive spacer film 320. The first film 316 has a surface which interfaces with a surface of an antiferromagnetic layer 322 so that the antiferromagnetic layer pins the magnetic moment 324 of the first film by exchange coupling in a pinned direction perpendicular to and away from the ABS. The spacer film 320 is very thin, in the order of 8 Å, which allows an antiferromagnetic exchange coupling between the first and second films 316 and 318. Accordingly, the magnetic moment 326 of the second film is directed in a direction opposite to the magnetic moment 324 of the first film 316, namely perpendicular to and toward the ABS. The thicker of the two films 316 and 318 determines the net magnetic moment of the AP pinned layer 312. The first film 316 has been selected to be the thicker of the two films so that the net magnetic moment is directed perpendicular to and away from the ABS. A capping layer 327 may cover the free layer 310.

The free layer 310 has a magnetic moment 328 which is free to rotate in first and second directions under the influence of field signals (flux incursions) from the rotating (disk 34. These field signals are positive and negative going signals, typically of equal magnitude. First and second leads 329 and 330 are electrically connected to the sensor 300 with a space therebetween which defines the active region of the sensor as well as the trackwidth of the read head employing the sensor. A sense current source 331 is electrically connected to the first and second leads for providing a sense current $I_S$, at a sense voltage $V_S$, which is conducted through the sensor as shown by the arrows in FIG. 11. In parallel with the sense current source 331 is a sensing circuit 322 for sensing potential changes across the sensor 300 when field signals are induced in the sensor by the rotating disk 34 shown in FIG. 2. The sense current source 331 and the sensing circuit 332 are part of the processing circuitry 50 in FIG. 3.

Each of the layers 310, 314, 316, 318 and 320 conduct a portion of the sense current between the first and second leads 329 and 330. As discussed hereinabove, a parameter in the operation of a spin valve sensor is limitation of the spacer layer 314 to a thickness less than the mean free path of conduction electrons flowing in the free and pinned layers 310 and 312. The degree of electron scattering, which depends upon the relative angle between the magnetization 328 of the free layer 310 and the magnetization 326 of the second film 318, determines the resistance of the sensor to the sense current $I_S$. The greatest scattering and the correspondingly greatest increase in resistance occurs when the magnetization 328 of the free layer and the magnetization 326 of the AP pinned layer are antiparallel, and the least scattering and the correspondingly least resistance change occurs when the magnetization 328 of the free layer and the magnetization 326 of the AP pinned layer are parallel with respect to one another.

The magnetization 328 of the free layer 310 is typically oriented substantially parallel to the ABS so that, upon receiving positive and negative field signals from a rotating disk, the magnetization 328 rotates upwardly or downwardly to decrease or increase the resistance of the sensor. The opposite effect would be produced if the magnetization of the second film 318 was oriented away from the ABS instead of toward the ABS. My investigation shows that when the sense current is directed as shown in FIGS. 11 and 12, the bias point will be shifted relative to the Transfer curve. This is caused by various influences on the free layer 310.

Various influences on the free layer and consequently various influences on the bias point of the transfer curve for the sensor 300 are shown in FIG. 12. The influences on the magnetic moment 328 of the free layer are $H_{demag}$ 334, $H_{FC}$ 336, the AMR EFFECT 338 and $H_{SC}$ 340, as discussed hereinabove. $H_{demag}$ 334 is less than $H_{demag}$ of a single film layer employed in a typical spin valve 200 of the first investigation because of the smaller net pinning moment of the AP pinned layer 312. The advantage of a small $H_{demag}$ in the AP pinned layer 312 is that exchange coupling between the antiferromagnetic layer 322 and the AP pinned layer 312 is increased to promote higher thermal stability of the AP pinned layer. In the embodiment shown in FIGS. 11 and 12 $H_{demag}$, $H_{FC}$ and $H_{SC}$ are perpendicular to and toward the ABS while the AMR EFFECT is directed perpendicularly to and away from the ABS. This is necessary to provide a bias point on the transfer curve of the AP pinned spin valve sensor 300 that promotes read signal symmetry. The direction of $H_{demag}$ and $H_{FC}$ can be reversed by orienting the spins of the antiferromagnetic layer 322 in an opposite direction, however, this would result in read signal asymmetry.

It should be noted that the aforementioned influences are all magnetic field influences except for the AMR EFFECT. While the AMR EFFECT is not a magnetic field its influence is the same as a magnetic field from the standpoint of displacing the bias point of the transfer curve of the spin valve sensor. The AMR EFFECT changes the resistance of the free layer 310, shown in FIG. 12, in the same manner that it changes the resistance of an MR stripe in an AMR sensor. In an AMR sensor the resistance of an MR stripe is at a maximum when the direction of the magnetic moment of the MR stripe is parallel or antiparallel to the direction of at sense current through the MR stripe, and the resistance is at a minimum when the direction of the magnetic moment of the MR stripe is perpendicular to the direction of the sense current. Accordingly, the resistance of the spin valve sensor due to the GMR effect is altered by the resistance due to the AMR EFFECT. This results in a shifting of the bias point relative to the transfer curve for the spin valve sensor.

FIG. 12 illustrates how the bias point is shifted relative to the transfer curve. Assuming that a positive magnetic incursion comes from a disk rotating near the ABS 48, the magnetic moment 356 in the free layer 310 will rotate upwardly which increases the resistance of the free layer due to the GMR effect. However, the upward rotation of the magnetic moment 356 causes the resistance of the free layer 310 to be reduced due to the AMR EFFECT. Accordingly, the resistance due to the GMR effect has been lessened by the resistance due to the AMR EFFECT resulting in a reduced positive signal. Now assuming that the magnetic disk rotating below the ABS induces a negative magnetic incursion on the spin valve the magnetic moment 356 of the free layer 310 rotates downwardly, decreasing the resistance of the free layer 310 due to the GMR effect and further decreasing the resistance of the layer 310 due to the AMR EFFECT. This results in a larger negative signal. Accordingly, the AMR EFFECT produces a reduced positive signal and a larger negative signal. This shifts the bias point on the transfer curve of the spin valve sensor upwardly so that the transfer curve is asymmetrical about a bias point, which will be described next.

Figure 13:
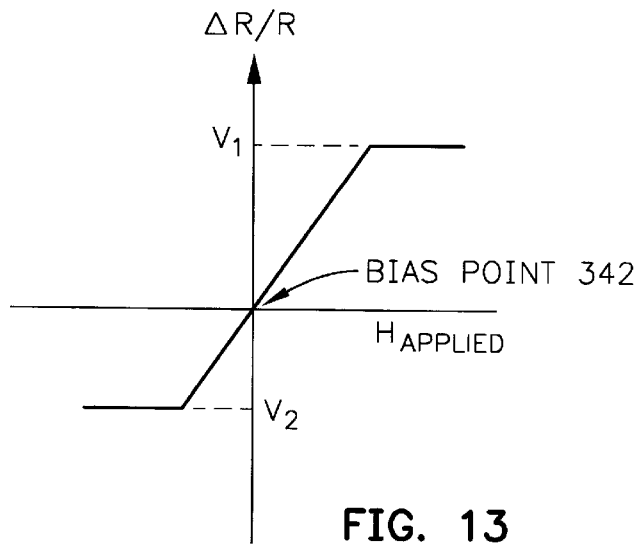
FIG. 13 is a transfer curve for an AP pinned spin valve sensor FIG. 11 under the influence of only a sense current field on the free layer.
Figure 14:
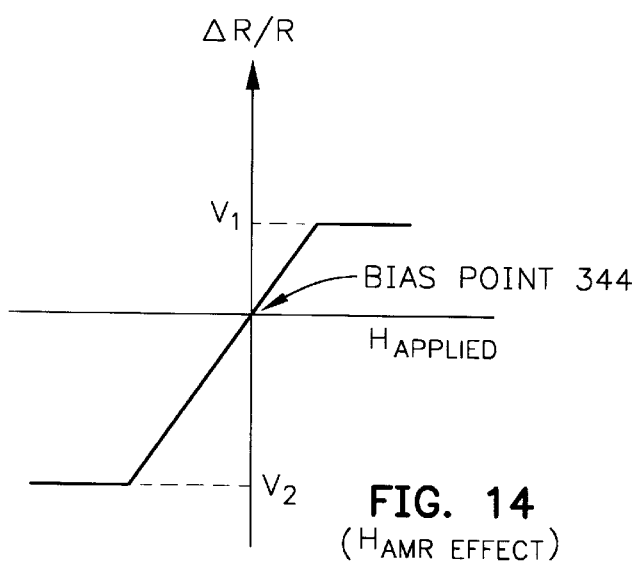
FIG. 14 is a transfer curve for the AP pinned spin valve sensor under the influence of only an AMR effect.
Figure 15:
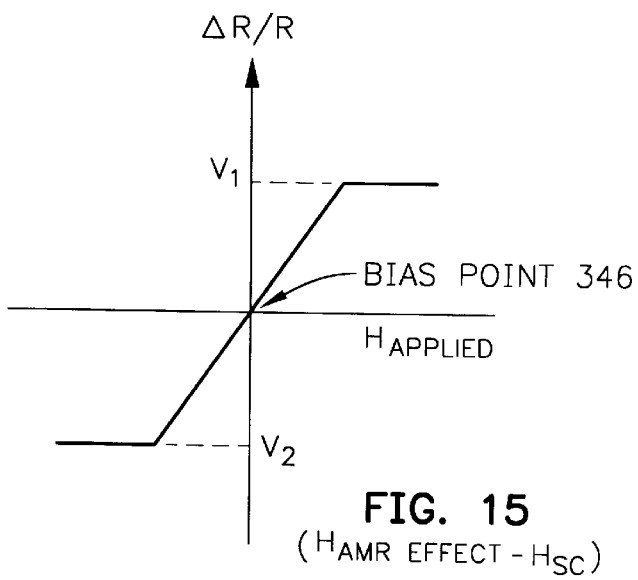
FIG. 15 is a transfer curve for the AP pinned spin valve sensor where the influence of the sense current field counterbalances the influence of the AMR effect on the free layer so that readback signal symmetry is promoted.

FIGS. 13, 14 and 15 are exemplary transfer curves for a spin valve sensor shown for the purpose of explaining the influence of sense current field $H_{SC}$ (FIG. 13), the AMR EFFECT (FIG. 14) and the combination of the AMR EFFECT and $H_{SC}$ (FIG. 15) on the bias point of the transfer curve. The transfer curve is a plot of $H_{applied}$ which is the positive and negative flux incursions from the rotating magnetic disk on the sensor versus the positive and negative readback signal voltages $V_1$ and $V_2$. If only the sense current field $H_{SC}$ is considered, as shown in FIG. 13, the positive and negative read signals $V_1$ and $V_2$ are asymmetrical with respect to a bias point 342 with the positive read signal $V_1$ being greater than the negative $V_2$. If only the AMR EFFECT is considered, as shown in FIG. 14, the read signals $V_1$ and $V_2$ are asymmetrical with respect to a bias point 344 with the negative read signal $V_2$ being greater than the positive read signal $V_1$. FIGS. 13 and 14 demonstrate that when the sense current $I_S$ is appropriately directed, as shown in FIG. 13, that the influence of the AMR EFFECT on the bias point can be counterbalanced as shown in FIG. 15. In FIG. 15 the sense current field $H_{SC}$ is subtracted from the AMR EFFECT to produce a zero influence on the bias point causing the positive and negative read signals $V_1$ and $V_2$ to be symmetrical with respect to the bias point 346 which is now at a zero point. This can be accomplished by appropriately directing the sense current $I_S$ with a predetermined magnitude.

When the sense current is directed, as shown by the arrows in FIG. 11, the sense current field $H_{SC}$ 354 is directed opposite to the AMR EFFECT 338 so that $H_{SC}$, $H_{demag}$ and $H_{FC}$ substantially counterbalance the AMR EFFECT and reduce the aforementioned asymmetry. This is accomplished by directing $I_S$ as shown in FIGS. 11 and 12. It should be noted that when the sense current field $H_{SC}$ is employed to counterbalance the AMR EFFECT that the magnetic moment 356 of the free layer 310 may not be parallel to the ABS as indicated by the open circle in FIG. 12.

ESD protection circuits 360 and 362 are connected in parallel across the sensor 300. The circuit 360 shunts current in the direction of the serve current $I_S$ while the circuit 362 shunts current in a direction opposite to the direction of the sense current $I_S$. The ESD protection circuit 360 may be provided with the same turn-on voltage as the circuit 240 in FIG. 9. However, the turn-on voltage for the spill valve sensor 300 in FIG. 11 can be significantly higher which will further prevent shunting of the sense current which will be described in more detail hereinafter. The ESD protection circuit 362 is provided with a turn-on voltage which is less than the circuit 360 since a resetting function will not be in this direction and this direction must be protected from ESDs.

A reset pulse generator circuit 364 is connected in parallel across the sensor 300 for resetting the magnetic spins of the antiferromagnetic layer 322 should these magnetic spins become destabilized by an ESD. The direction of the current and the voltage of the reset pulse generator is in the same direction as the sense current $I_S$ and sense voltage of the source 331. The reset current and reset voltage is higher than the sense current and sense voltage $V_S$ but lower than the turn-on voltage of the ESD protection circuit 360. Accordingly, when the antiferromagnetic layer 322 becomes destabilized a switch 366 is closed allowing the reset pulse generator 364 to send a reset current through the antiferromagnetic layer 322 for a predetermined duration for resetting the magnetic spins of the antiferromagnetic layer. The reset voltage may be just under the turn-on voltage of the ESD protection circuit 360, which will be discussed in more detail hereinafter. Assuming diodes of equal turn-on voltages, the ESD protection circuit 360 may be represented by two diodes while the ESD protection circuit 362 is represented by only one diode. In this example, the turn-on voltage of the circuit 362 would be one-half the turn-on voltage of the circuit 360.

The turn-on voltage of the circuit 362 can be less than the turn-on voltage of the circuit 360 since no reset function is implemented in a direction reverse to the sense current $I_S$. Further, it is important that the turn-on voltage of the circuit 362 be sufficiently low since ESDs in that direction destabilize the magnetic spins of the antiferromagnetic layer 322. For example, if the circuit 362 had the same turn-on voltage as the circuit 360 an ESD just below the turn-on voltage of the circuit 362 would then destabilize the magnetic spins of the antiferromagnetic layer 322. With just one diode in the circuit 362, ESDs with a voltage less than the turn-on voltage of the circuit 362 will not destabilize the antiferromagnetic layer 322. The advantage of the results from my second investigation is that the turn-on voltage of the ESD protection circuit 360 can be sufficiently high to prevent sense current leakage past the sensor and yet can still allow for resetting the antiferromagnetic layer in that direction. It should be noted, however, that even more diodes can be added to the ESD protection circuit 360 in the forward direction since ESDs in that direction perform a resetting function of the magnetic spins of the antiferromagnetic layer 322. Accordingly, the turn-on voltage of the ESD protection circuit 360 can be increased to a point just below the melting temperature of the layers of the sensor. This increase in the turn-on voltage would further prevent any shunting of the sense current $I_S$.

In an exemplary embodiment of my second investigation, the antiferromagnetic layer 322 is nickel oxide (NiO) 400 Å thick, the first film 316 is cobalt (Co) 30 Å thick, the spacer layer 320 is ruthenium (Ru) 6 Å thick, the second film 318 is cobalt (Co) 24 Å thick, the spacer layer 314 is copper (Cu) 22 Å thick, the free layer 310 is nickel iron (NiFe) 72 Å thick and the capping layer 327 is tantalum (Ta) 30 Å thick. The height of the layers and films is 0.7 μm. The sense current $I_S$ is 6 mA and the sense voltage is 0.3 mv. The reset voltage is 1.0 mv. The turn-on voltage for the ESD protection circuit 360 is 1.2 mv and the turn-on voltage for the ESD protection circuit 362 is 0.6 mv. The duration of the reset current is 100 ns. The reset voltage is preferably three times the sense voltage $V_S$, such as 1.0 mv. The duration of the reset pulse is preferably 50 ns to 100 ns. The reset pulse generator 364 for generating such pulses is well known in the art. The turn-on voltage of the ESD protection circuit 360 can be just below the melting temperatures of the layers of the sensor, as discussed hereinabove. The aforementioned values are merely exemplary and it should be understood that there are other combinations within the spirit of the invention. For instance, the antiferromagnetic layer 322 could be NiMn or FeMn instead of NiO. In my second investigation I reset a NiO antiferromagnetic layer of the spin valve 300 with a field of 13 KOe at a temperature of 200° C. Even though the amplitude and symmetry of the readback signal reached an optimum value, I found that the magnetic stability of the first film 316 was not as good as it should be under stress conditions, such as excitation of the write head. I found that the magnetic stability was improved dramatically when the antiferro-magnetic layer 322 was subjected to a temperature of 240° C. in the presence of a field of 13 KOe. I found that the asymmetry stability sigma improved from 2.4% after the 240° C. reset as compared to 6% for the 200° C. reset. These results showed that a proper reset is critical in order to achieve acceptable performance of the AP spin valve sensor.

Another advantage of the spin valve sensor 300 is that the sense current through the free layer 310 will cause a sense current field which is imposed on and increases the magnetic strength of the pinning moment 324 of the first film 316. This will promote thermal stability of the sensor from the standpoint that high temperature incursions due to contact of the head with asperities on the rotating disk or electrostatic discharge from a person or object will not disorient the direction of the magnetic moment 324 until a higher temperature is reached.

The processing circuitry for the AP spin valve sensor 300 shown in FIG. 11 can be the same as that shown in FIG. 6 of U.S. Pat. No. 5,650,887 with the exception of the ESD protection circuits 360 and 362 described hereinabove. Further, the other teachings in the patent are applicable to the present invention, including the reset pulse generator generating a pulse with first and second amplitudes with the exception of the teaching in the patent that the spin valve sensor is a single film pinned layer valve sensor.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. An antiparallel (AP) pinned spin valve read head sensor and a sensor circuit that are connected in parallel, comprising:

the AP pinned spin valve read head sensor including:
a ferromagnetic free layer, a nonmagnetic spacer layer and an antiparallel (AP) pinned layer;
the spacer layer being located between the free layer and the AP pinned layer;
the AP pinned layer including:
at least first and second ferromagnetic films and a nonmagnetic electrically conductive spacer film; and
the spacer film being located between the first and second films;
an antiferromagnetic layer immediately adjacent said first film that has magnetic spins in a pinning direction that pins the magnetic moment of the first film along a first pinned direction which causes the first film to pin the magnetic moment of the second film in a second pinned direction that is antiparallel to said first pinned direction;
the sensor circuit including:
is a sense current source for applying a sense current to the sensor;
a sensing circuit for detecting a sense voltage across the sensor;

first and second diode circuits;

a reset pulse generator for applying a reset pulse; and the sense current source, the sensing circuit, the first and second diode circuits and the reset pulse generator being connected in parallel across the sensor;

the sense current of the sense current source being directed through the sensor in a direction that produces a sense current field from the free layer that is in the same direction as the pinning direction of the magnetic spins of the antiferromagnetic layer;

the first diode circuit being connected in parallel across the sensor for shunting current from an electrostatic discharge (ESD) in the direction of the sense current when a turn-on voltage of the first diode has been exceeded;

the second diode circuit being connected in parallel across the sensor for shunting current from an ESD in a direction opposite to the sense current when a turn-on voltage of the second diode circuit has been exceeded;

the turn-on voltage of the first diode circuit being greater than the turn-on voltage of the second diode circuit;

the sense voltage being less than the turn-on voltage of the first diode circuit;

the reset pulse having a current in the same direction as the sense current for orienting the magnetic spins of the antiferromagnetic layer in said pinning direction; and the reset pulse having a voltage greater than the sense voltage but less than the turn-on voltage of the first diode circuit.

2. A sensor as claimed in claim 1 wherein the current, voltage and a pulse duration of the reset pulse generator increases a temperature of the antiferromagnetic layer above its blocking temperature.

3. A sensor as claimed in claim 1 wherein the turn-on voltage of the first diode circuit is less than a voltage that results in melting of any component of the sensor.

4. A sensor as claimed in claim 1 including:

the sense current source applying a constant sense current at a constant sense voltage;

the sensor having a constant resistance and constant quiescent voltage in a quiescent state when no magnetic field is imposed thereon; and the reset voltage being equal to or greater than two times the quiescent voltage.

5. A sensor as claimed in claim 4 wherein the quiescent voltage is approximately 0.3 millivolts.

6. A sensor as claimed in claim 4 wherein the reset voltage is approximately three times the quiescent voltage.

7. A sensor as claimed in claim 4 wherein the reset voltage has a pulse width of approximately 20–30 nanoseconds.

8. A sensor as claimed in claim 1 wherein the reset pulse generator raises a temperature of the antiferromagnetic layer to a temperature above 200° C.

9. A sensor as claimed in claim 1 wherein the antiferromagnetic layer is made of NiO.

10. A sensor as claimed in claim 9 wherein the reset pulse generator raises the temperature of the antiferromagnetic layer to a temperature of approximately 240° C. and causes a reset current field of approximately 13 KOe to be impressed on the antiferromagnetic layer.

11. A sensor as claimed in claim 1 wherein the AP pinned layer includes only said first and second ferromagnetic films and said nonmagnetic electrically conductive spacer film.

12. A sensor as claimed in claim 1 wherein the first diode circuit consists essentially of only two diodes of equal turn-on voltage which together equal said turn-on voltage of the first diode circuit and the second diode circuit consists essentially of only one diode with a turn-on voltage equal to either of the diodes of the first diode circuit and which is equal to said turn-on voltage of the second diode circuit.

13. A sensor as claimed in claim 1 wherein the turn-on voltage of the second diode circuit is below a voltage that reorients the direction of the magnetic spins of the antiferromagnetic layer.

14. A sensor as claimed in claim 13 wherein the current, the voltage and a pulse duration of the reset pulse generator increases a temperature of the antiferromagnetic layer above its blocking temperature.

15. A sensor as claimed in claim 14 wherein the turn-on voltage of the first diode circuit is less than a voltage that results in melting of any component of the sensor.

16. A sensor as claimed in claim 15 including:

the sense current source applying a constant sense current at a constant sense voltage; and the sensor having a constant resistance and constant quiescent voltage in a quiescent state when no magnetic field from a magnetic medium is imposed thereon; and the reset pulse having a voltage equal to or greater than two times the quiescent voltage.

17. A sensor as claimed in claim 16 wherein the reset pulse has a pulse width of approximately 20–30 nanoseconds.

18. A sensor as claimed in claim 17 wherein the reset pulse generator raises a temperature of the antiferromagnetic layer to a temperature above 200° C.

19. A sensor as claimed in claim 18 wherein the antiferromagnetic layer is made of NiO.

20. A sensor as claimed in claim 19 wherein the reset pulse generator raises the temperature of the antiferromagnetic layer to a temperature of approximately 240° C. and causes a reset current field of approximately 13 KOe to be impressed on the antiferromagnetic layer.

21. A thin film magnetoresistive (MR) spin valve read sensor connected to a sensor circuit wherein the sensor has positive and negative read signal symmetry about a zero bias point of a transfer curve upon sensing positive and negative magnetic incursions of equal magnitude from a moving magnetic medium comprising:

a ferromagnetic free layer having a magnetic moment which is free to rotate in first and second directions from a neutral position upon sensing said positive and negative magnetic incursions respectively, the neutral position corresponding to said bias point;

a pinned layer having a magnetic moment which is pinned in first and second pinned directions;

the pinned layer including:

first and second ferromagnetic thin films and a nonmagnetic electrically conductive spacer film; and the spacer film being located between the first and second films;

an antiferromagnetic layer immediately adjacent said first thin film that has magnetic spins directed for pinning the magnetic moment of the first thin film along said first pinned direction which causes the magnetic moment of the second thin film to be pinned in said second pinned direction;

a nonmagnetic electrically conductive spacer layer sandwiched between the free layer and the pinned layer so that upon sensing said positive and negative magnetic incursions the magnetic moment of the free layer rotates in said first and second directions relative to said second pinned direction;

the sensor circuit including:
  a sense current source for applying a sense current to the sensor;
  a sensing circuit for detecting a sense voltage across the sensor;
  first and second diode circuits;
  a reset pulse generator for applying a reset pulse; and
  the sense current source, the sensing circuit, the first and second diode circuits and the reset pulse generator being connected in parallel across the sensor;
  the sense current of the sense current source being directed through the sensor in a direction that produces a sense current field from the free layer that is in the same direction as the pinning direction of the magnetic spins of the antiferromagnetic layer;
  the direction of the magnetic moment of the free layer and thus the zero bias point being influenced by a ferromagnetic coupling field ($H_{FC}$) from said second film of the pinned layer, a demagnetization field ($H_{demag}$) from the pinned layer, an anisotropic magnetoresistance effect (AMR EFFECT) of the free layer and, upon applying said sense current, a net sense current field ($H_{SC}$) due to fields from electrically conductive layers of the sensor other than the free layer; and
  said sense current being of such a magnitude that a net influence of $H_{FC}$, $H_{demag}$, the AMR EFFECT, and $H_{SC}$ on the free layer is substantially zero so that the sensor has substantially positive and negative read signal symmetry about said zero bias point;
  a first diode circuit connected in parallel across the sensor for shunting current from an electrostatic discharge (ESD) in the direction of the sense current when a turn-on voltage of the first diode has been exceeded;
  a second diode circuit connected in parallel across the sensor for shunting current from an ESD in a direction opposite to the sense current when a turn-on voltage of the second diode circuit has been exceeded;
  the turn-on voltage of the first diode circuit being greater than the turn-on voltage of the second diode circuit;
  the sense voltage being less than the turn-on voltage of the first diode circuit;
  the reset pulse having a current in the same direction as the sense current for orienting the magnetic spins of the antiferromagnetic layer in said pinning direction; and
  the reset pulse having a voltage greater than the sense voltage but less than the turn-on voltage of the first diode circuit.

22. A sensor as claimed in claim 21 wherein the direction of the fields $H_{FC}$, $H_{demag}$ and $H_{SC}$ are perpendicular to and toward an air bearing surface (ABS) and the direction of the influence of the AMR EFFECT is perpendicular to and away from the air bearing surface (ABS).

23. A sensor as claimed in claim 22 wherein the AMR EFFECT has an influence on the free layer which is equivalent to the magnetic fields $H_{FC}$, $H_{demag}$ and $H_{SC}$ and is antiparallel thereto.

24. A sensor as claimed in claim 23 wherein the first thin film is thicker than the second thin film so that the direction of the magnetic moment of the first thin film defines the direction of the field $H_{demag}$.

25. A sensor as claimed in claim 24 wherein the current, the voltage and a pulse duration of the reset pulse generator increases a temperature of the antiferromagnetic layer above its blocking temperature.

26. A sensor as claimed in claim 25 wherein the turn-on voltage of the first diode circuit is less than a voltage that results in melting of any component of the sensor.

27. A sensor as claimed in claim 26 including:
  the sense current source applying a constant sense current at a constant sense voltage; and
  the sensor having a constant resistance and constant quiescent voltage in a quiescent state when no magnetic field is imposed thereon; and
  the reset pulse having a voltage equal to or greater than two times the quiescent voltage.

28. A sensor as claimed in claim 27 wherein the reset pulse has a width of approximately 20 nanoseconds.

29. A sensor as claimed in claim 28 wherein the reset pulse generator raises a temperature of the antiferromagnetic layer to a temperature above 200° C.

30. A magnetic head comprising:
  a write head including:
    at least one coil layer and an insulation stack;
    the coil layer being embedded in the insulation stack;
    first and second pole pieces connected at a back gap arid having pole tips with edges forming a portion of an air bearing surface (ABS);
    the insulation stack being located between the first and second pole pieces; and
    a write gap layer located between the pole tips of the first and second pole pieces and forming a portion of the ABS;
  an antiparallel (AP) pinned spin valve read head sensor connected to a sensor circuit;
  the AP pinned spin valve read head sensor including:
    a ferromagnetic free layer, a nonmagnetic spacer layer and an antiparallel (AP) pinned layer;
    the spacer layer being located between the free layer and the AP pinned layer;
  the AP pinned layer including:
    at least first and second ferromagnetic films and a nonmagnetic electrically conductive spacer film; and
    the spacer film being located between the first and second films;
  an antiferromagnetic layer immediately adjacent said first film that has magnetic spins in a pinning direction that pins the magnetic moment of the first film along a first pinned direction which causes the first film to pin the magnetic moment of the second film in a second pinned direction that is antiparallel to said first pinned direction;
  the sensor circuit including:
    a sense current source for applying a sense current to the sensor;
    a sensing circuit for detecting a sense voltage across the sensor;
    first and second diode circuits;
    a reset pulse generator for applying a reset pulse; and
    the sense current source, the sensing circuit, the first and second diode
  circuits and the reset pulse generator being connected in parallel across the sensor;
    the sense current of the sense current source being directed through the sensor in a direction that produces a sense current field from the free layer that is in the same direction as the pinning direction of the magnetic spins of the antiferromagnetic layer;

the first diode circuit being connected in parallel across the sensor for shunting current from an electrostatic discharge (ESD) in the direction of the sense current when a turn-on voltage of the first diode has been exceeded;

the second diode circuit being connected in parallel across the sensor for shunting current from an ESD in a direction opposite to the sense current when a turn-on voltage of the second diode has been exceeded;

the turn-on voltage of the first diode circuit being greater than the turn-on voltage of the second diode circuit;

the sense voltage being less than the turn-on voltage of the first diode circuit;

the reset pulse having a current in the same direction as the sense current for orienting the magnetic spins of the antiferromagnetic layer in said pinning direction; and the reset pulse having a voltage greater than the sense voltage but less than the turn-on voltage of the first diode circuit.

31. A magnetic head as claimed in claim 30 including:

the direction of the magnetic moment of the free layer and thus a zero bias point being influenced by a ferromagnetic coupling field ($H_{FC}$) from said second film of the pinned layer, a demagnetization field ($H_{demag}$) from the pinned layer, an anisotropic magnetoresistance effect (AMR EFFECT) of the free layer and, upon applying said sense current, a net sense current field ($H_{SC}$) due to fields from electrically conductive layers of the sensor other than the free layer; and said sense current source applying the sense current in a direction so that a net influence of $H_{FC}$, $H_{demag}$, the AMR EFFECT, and $H_{SC}$ on the free layer is substantially zero whereby the sensor has substantially positive and negative read signal symmetry about said zero bias point.

32. A magnetic head as claimed in claim 31 wherein the sensor has the bearing surface (ABS) and is in a quiescent state when no signal is received from a magnetic disk, the magnetic head comprising:

the pinned direction being perpendicular to the ABS; and the magnetic moment of the free layer being directed slightly non-parallel to the ABS due to compensation for the AMR EFFECT when the sensor is in said quiescent state.

33. A magnetic head as claimed in claim 32 wherein the direction of the fields $H_{FC}$, $H_{demag}$ and $H_S$ is perpendicular to and toward the ABS and the direction of the influence of the AMR EFFECT is perpendicular to and away from the ABS.

34. A magnetic head as claimed in claim 33 wherein the AMR effect has an influence on the free layer which is equivalent to the fields $H_{FC}$, $H_{demag}$ and $H_{SC}$ and is antiparallel thereto.

35. A magnetic head as claimed in claim 34 wherein the first thin film is thicker than the second thin film so that the direction of the magnetic moment of the first thin film defines the direction of the field $H_{demag}$.

36. A magnetic head as claimed in claim 35 wherein the current the voltage and a pulse duration of the reset pulse generator increases a temperature of the antiferromagnetic layer above its blocking temperature.

37. A magnetic head as claimed in claim 36 wherein the turn-on voltage of the first diode circuit is less than a voltage that results in melting of any component of the sensor.

38. A magnetic head as claimed in claim 37 including:

the sense current source applying a constant sense current at a constant sense voltage;

the sensor having a constant resistance and constant quiescent voltage in the quiescent state when no magnetic field is imposed thereon; and the reset pulse having a voltage equal to or greater than two times the quiescent voltage.

39. A magnetic head as claimed in claim 38 wherein the reset pulse has a pulse width of approximately 20–30 nanoseconds.

40. A magnetic head as claimed in claim 39 wherein the reset pulse generator raises a temperature of the antiferromagnetic layer to a temperature above 200° C.

41. A magnetic disk drive comprising:

a write head including:

at least one coil layer and an insulation stack;

the coil layer being embedded in the insulation stack;

first and second pole pieces connected at a back gap and having pole tips with edges forming a portion of an air bearing surface (ABS);

the insulation stack being located between the first and second pole pieces; and a write gap layer located between the pole tips of the first and second pole pieces and forming a portion of the ABS;

an antiparallel (AP) pinned spin valve read head sensor connected to a sensor circuit; the AP pinned spin valve read head sensor including:

a ferromagnetic free layer, a nonmagnetic spacer layer and an antiparallel (AP) pinned layer;

the spacer layer being located between the free layer and the AP pinned layer; the AP pinned layer including:

at least first and second ferromagnetic films and a nonmagnetic electrically conductive spacer film; and the spacer film being located between the first and second films;

an antiferromagnetic layer immediately adjacent said first thin film that has magnetic spins in a pinning direction that pins the magnetic moment of the first thin film along a first pinned direction which causes the first thin film to pin the magnetic moment of the second thin film in a second pinned direction that is antiparallel to said first pinned direction;

the sensor circuit including:

a sense current source for applying a sense current to the sensor;

a sensing circuit for detecting a sense voltage across the sensor;

first and second diode circuits;

a reset pulse generator for applying a reset pulse; and the sense current source, the sensing circuit, the first and second diode circuits and the reset pulse generator being connected in parallel across the sensor;

the sense current of the sense current source being directed through the sensor in a direction that produces a sense current field from the free layer that is in the same direction as the pinning direction of the magnetic spins of the antiferromagnetic layer;

the first diode circuit being connected in parallel across the sensor for shunting current from an electrostatic discharge (ESD) in the direction of the sense current when a turn-on voltage of the first diode has been exceeded;

the second diode circuit being connected in parallel across the sensor for shunting current from an ESD in a direction opposite to the sense current when a turn-on voltage of the second diode has been exceeded;

the turn-on voltage of the first diode circuit being greater than the turn-on voltage of the second diode circuit;

the sense voltage being less than the turn-on voltage of the first diode circuit;

the reset pulse having a current in the same direction as the sense current for orienting the magnetic spins of the antiferromagnetic layer in said pinning direction; and the reset pulse having a voltage greater than the sense voltage but less than the turn-on voltage of the first diode circuit;

the write head and the read head sensor being adjacent one another to form a combined magnetic head;

a frame;

a magnetic disk rotatably supported on the frame;

a support mounted on the frame for supporting the combined magnetic head in a transducing relationship with the magnetic disk;

means for rotating the magnetic disk;

positioning means connected to the support for moving the combined magnetic head to multiple positions with respect to said magnetic disk; and means connected to the combined magnetic head, to the means for rotating the magnetic disk and to the positioning means for exchanging signals with the combined magnetic head, for controlling movement of the magnetic disk and for controlling the position of the combined magnetic head.

42. A magnetic disk drive as claimed in claim 41 including:

the direction of the magnetic moment of the free layer and thus a zero bias point being influenced by a ferromagnetic coupling field ($H_{FC}$) from said second film of the pinned layer, a demagnetization field ($H_{demag}$) from the pinned layer, an anisotropic magnetoresistance effect (AMR EFFECT) of the free layer and, upon applying said sense current, a net sense current field ($H_{SC}$) due to fields from electrically conductive layers of the sensor other than the free layer; and said sense current and sense voltage source means applying the sense current in a direction so that a net influence of $H_{FC}$, $H_{demag}$, the AMR EFFECT, and $H_{SC}$ on the free layer is substantially zero whereby the sensor has substantially positive and negative read signal symmetry about said zero bias point.

43. A magnetic disk drive as claimed in claim 42 wherein the sensor has the air bearing surface (ABS) and is in a quiescent state when no signal is received from the magnetic disk, the magnetic head comprising:

the pinned direction being perpendicular to the ABS; and the magnetic moment of the free layer being directed slightly non-parallel to the ABS due to compensation for the AMR EFFECT when the sensor is in said quiescent state.

44. A magnetic disk drive as claimed in claim 43 wherein the direction of the fields $H_{FC}$, $H_{demag}$ and $H_S$ is perpendicular to and toward the ABS and the direction of the influence of the AMR EFFECT is perpendicular to and away from the ABS.

45. A magnetic disk drive as claimed in claim 44 wherein the AMR effect has an influence on the free layer which is equivalent to the fields $H_{FC}$, $H_{demag}$ and $H_{SC}$ and is antiparallel thereto.

46. A magnetic disk drive as claimed in claim 45 wherein the first thin film is thicker than the second thin film so that the direction of the magnetic moment of the first thin film defines the direction of the field $H_{demag}$.

47. A magnetic disk drive as claimed in claim 46 wherein the current, the voltage and a pulse duration of the reset pulse generator increases a temperature of the antiferromagnetic layer above its blocking temperature.

48. A magnetic disk drive as claimed in claim 47 wherein the turn-on voltage of the first diode circuit is less than a voltage that results in melting of any component of the sensor.

49. A magnetic disk drive as claimed in claim 48 including:

the sense current source applying a constant sense current at a constant sense voltage; and the sensor having a constant resistance and constant quiescent voltage in a quiescent state when no magnetic field is imposed thereon; and the reset pulse having a voltage equal to or greater than two times the quiescent voltage.

50. A magnetic disk drive as claimed in claim 49 wherein the reset voltage has a pulse width of approximately 20–30 nanoseconds.

51. A magnetic disk drive as claimed in claim 50 wherein the reset pulse generator raises a temperature of the antiferromagnetic layer to a temperature above 200° C.

* * * * *